C. NICHOLS.
SEED REMOVER.
APPLICATION FILED APR. 17, 1920.

1,356,997.

Patented Oct. 26, 1920.
5 SHEETS—SHEET 1.

Carl Nichols INVENTOR
BY Victor J. Evans
ATTORNEY

WITNESS:

C. NICHOLS.
SEED REMOVER.
APPLICATION FILED APR. 17, 1920.

1,356,997.

Patented Oct. 26, 1920.
5 SHEETS—SHEET 2.

Carl Nichols INVENTOR
BY *Victor J. Evans*
ATTORNEY

WITNESS:
*Edwin F. McKee*
*L. B. Middleton*

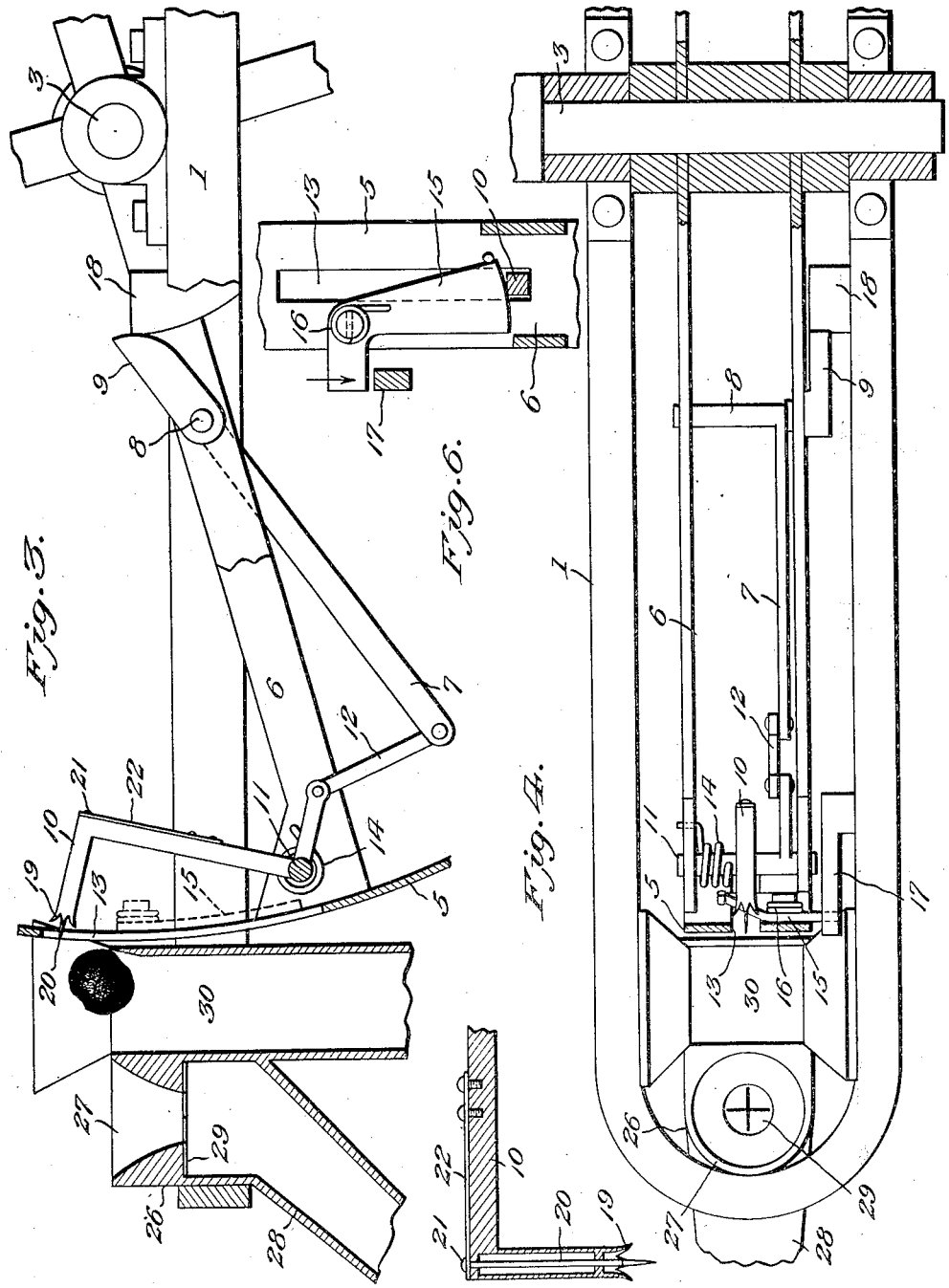

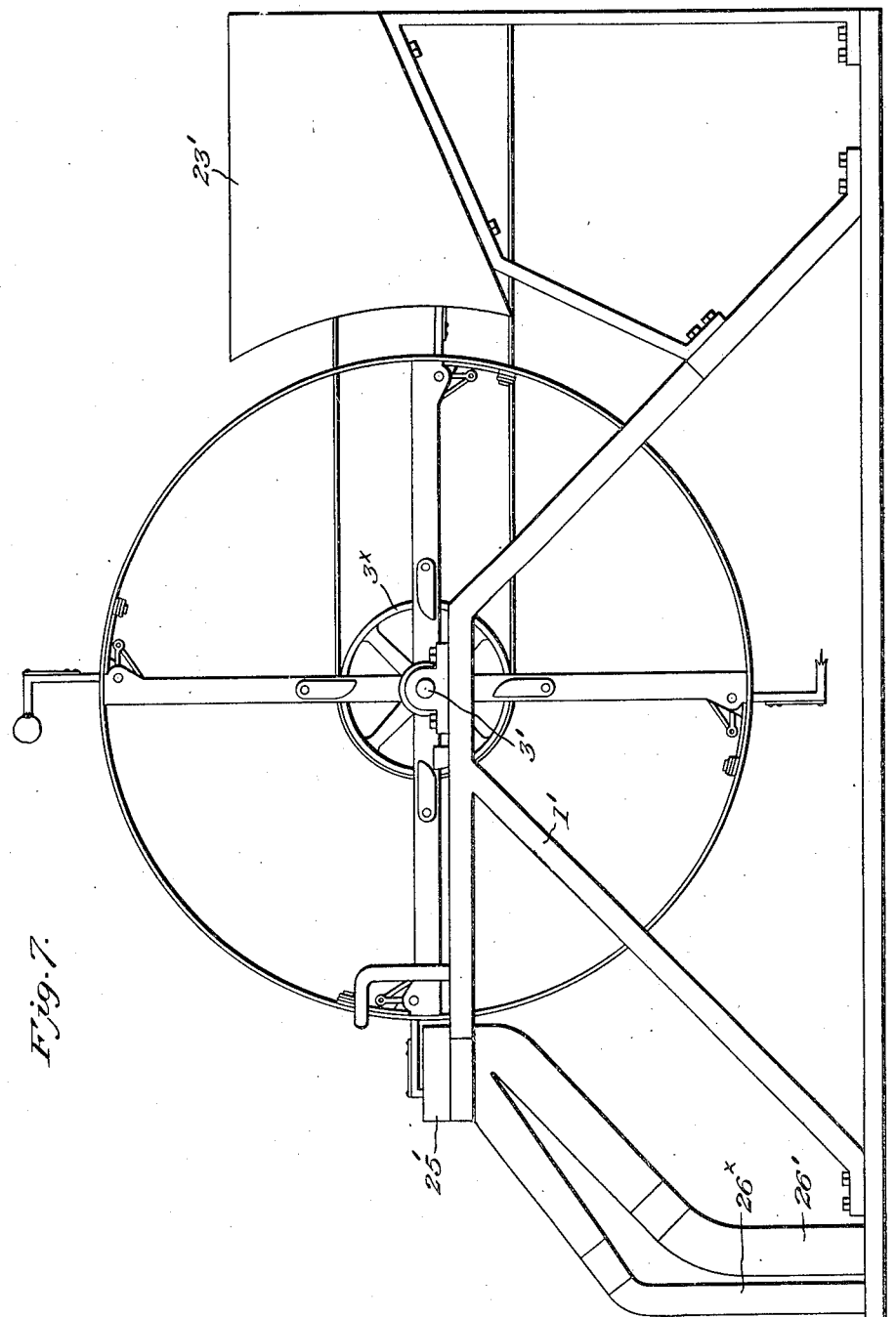

C. NICHOLS.
SEED REMOVER.
APPLICATION FILED APR. 17, 1920.

1,356,997.

Patented Oct. 26, 1920.
5 SHEETS—SHEET 5.

Carl Nichols INVENTOR
BY Victor J. Evans
ATTORNEY

UNITED STATES PATENT OFFICE.

CARL NICHOLS, OF WINCHESTER, IDAHO.

SEED-REMOVER.

1,356,997.

Specification of Letters Patent.

Patented Oct. 26, 1920.

Application filed April 17, 1920. Serial No. 374,609.

*To all whom it may concern:*

Be it known that I, CARL NICHOLS, a citizen of the United States, residing at Winchester, in the county of Lewis and State of Idaho, have invented new and useful Improvements in Seed-Removers, of which the following is a specification.

This invention relates to means for removing the seeds or pits from cherries and the principal object of the invention is to provide rotatable means for picking up the cherries from the hopper and carrying them to another point where the pit is removed from the cherry and the cherry and pit are separated so that the cherry may be caught by one receptacle and the pit by another.

Another object of the invention is to provide a single rotary member which is provided with the pitting means so that the device may be used in homes or to combine a plurality of such rotary members and drive them by power for use in canning factories and the like.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is an enlarged view of one set of the punch actuating means.

Fig. 4 is a plan view of Fig. 3 with parts in section.

Fig. 5 is an enlarged sectional view of one of the punches.

Fig. 6 is a sectional detail view showing the latch member for holding the punch in its operative position.

Fig. 7 is an elevation showing an apparatus for factory use.

Figure 1:
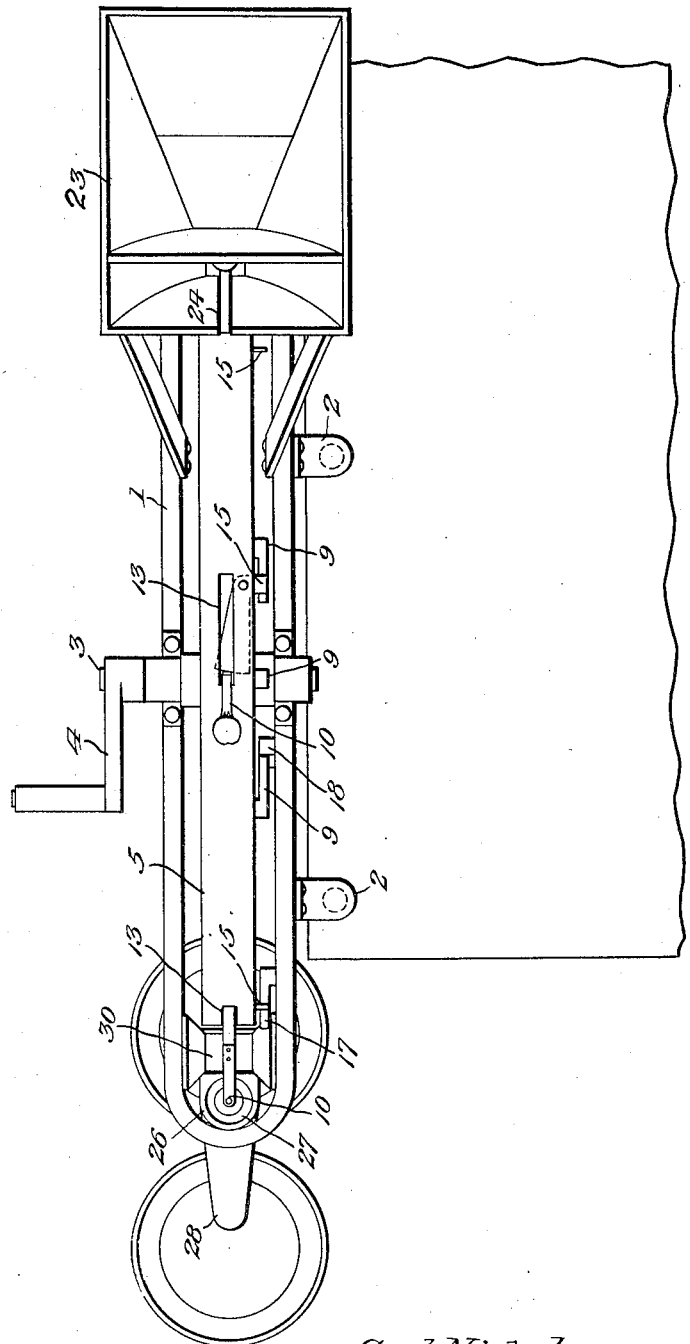
Figure 1 is a plan view of the single form of the invention, showing the same attached to a table.
Figure 2:
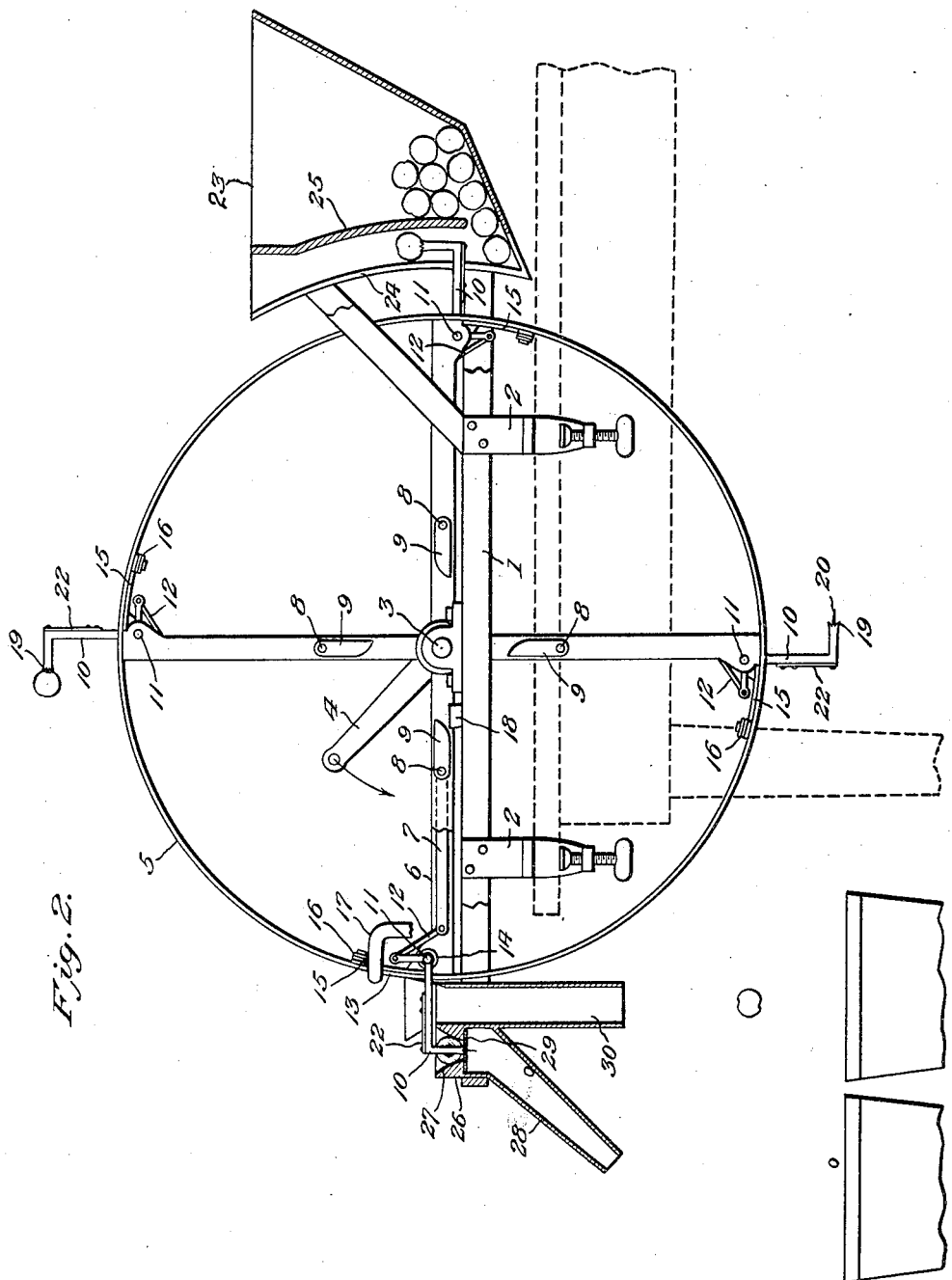
Fig. 2 is a side view thereof with parts in section.

In these views 1 indicates a frame of substantially oblong shape with rounded ends. One of the side bars of this frame is provided with the clamps 2 by which the frame may be clamped on the edge of a table. A shaft 3 is journaled at the centers of the side bars of the frame and this shaft is provided with a crank 4 for rotating it. A wheel member 5 has its hub secured to said shaft and said member is adapted to revolve within the frame with its rim adjacent the rounded ends of the frame. The spokes of this wheel member are provided with slots 6 and a bar 7 is pivotally mounted in each slot by means of the pivot pin 8 which passes through the inner end of the bar. This pin projects from one side of the spoke and this projecting end receives a small arm 9 having an inclined end. These parts are so connected together that when the arm is moved the bar will also be moved and swung out of the slot. The outer end of each spoke also carries the punch 10 which is mounted for rocking movement on the shaft 11 located adjacent the outer ends of each spoke. The inner end of the punch is connected with the outer end of the bar 7 by the link 12 so that the movement of the bar will cause the punch to rock on its shaft. The punch projects through a slot 13, formed in the rim of the wheel member adjacent the spoke and a spring 14 on the shaft 11 tends to hold the punch in its lower position with the bar 7 in its slot. The punch is also held in its lowest position by means of the latch member 15 of substantially wedge-shape and having its small end bent at right angles. Adjacent the bend this latch member is pivoted to the inside of the rim and a spring 16 tends to hold the enlarged part of the latch member across the slot 13 in the rim with its lower edge preventing upward movement of the punch. This latch member is swung outwardly to clear the slot to permit the punch to move upwardly, by means of a bumper 17 supported on the frame. A second bumper 18 is located on the frame and this bumper is adapted to engage with the inclined end of the arm 9, as the wheel member rotates, to force said arm upward and thus lower the bar 7 to swing the punch upwardly on its shaft. The first bumper is of greater height so that the latch member is swung clear of the punch before the arm engages the second bumper.

The outer end of each punch is of L-shape, as shown, the bent arm of the punch is of tubular construction and its extremity is formed with the outwardly bent prongs 19, these prongs forming a cup. A needle 20 passes through this bent arm and has its head 21 projecting from the rear end thereof and said head is engaged by a flat spring 22 carried by the other arm of the punch. This spring will force the point of the needle beyond the prongs.

At one end of the frame is arranged a hopper or bin 23 which has its inner face curved to conform to the shape of the rim of the wheel. This face is provided with a slot 24 to receive the punches, it being understood that the ends of the frame are also slotted to permit the passage of the punches. A partition plate 25 is located in the bin in front of said slot so as to keep the cherries spaced from the slotted face of the bin. The lower end of this plate is spaced from the bottom of the bin to permit the cherries to pass under it. I prefer to make the bottom of the bin slightly inclined so that the cherries will roll under said plate against the lower part of the curved face. The ends of the slot 24 are carried into the top and bottom parts of the bin so as to permit free passage of the punches.

On the opposite end of the frame is located the separator frame 26. This frame is provided with the downwardly tapered opening 27, the lower end of which is connected with the downwardly inclined chute 28. A leather washer 29 is placed in the bottom of said opening 27 and said washer is cut to divide it into quarters. The frame 26 is also provided with a chute 30 which is formed in the upper face thereof adjacent its inner side so that this chute lies close to the rim of the wheel.

The operation is as follows: The hopper or bin is filled with cherries and then the wheel member rotated by the handle. The punches will pass upwardly through the bin and on this side of the wheel the punches have their prongs uppermost so that a cherry will be picked up by the prongs and the cherry will be firmly held by being pierced by the needle. As the wheel member revolves the punch with the cherry thereon will pass from the bin and will be brought to the opposite side of the frame, the needle preventing the cherries from dropping off when the punch starts to descend. The pronged end of the punch with the cherry will enter the opening 27 in the separator frame and the cherry will be caught and held by the outer part of said opening so that the forward movement of the punch will press the seed or pit from the cherry and force it through the washer. Just about this time the first bumper 17 will be struck by the latch member 15 so that this latch member will be swung free of the punch and then the second bumper will be engaged by the arm 9 and the bar 7 swung downwardly and the punch swung upwardly through the slot in the rim. As the punch leaves the washer this washer will strip the pit from the punch. As it passes through this slot the cherry will be forced from the punch and will drop into the chute 30 and roll down the same into a suitable receptacle. Before the punch is returned to its outer position the spoke carrying it will have passed the separator frame. Then the punch will return to normal position and be ready to pick up another cherry from the bin.

By providing a plurality of spokes, each provided with a punch, a great number of cherries may be pitted quickly and easily by simply rotating the wheel member.

Figure 8:
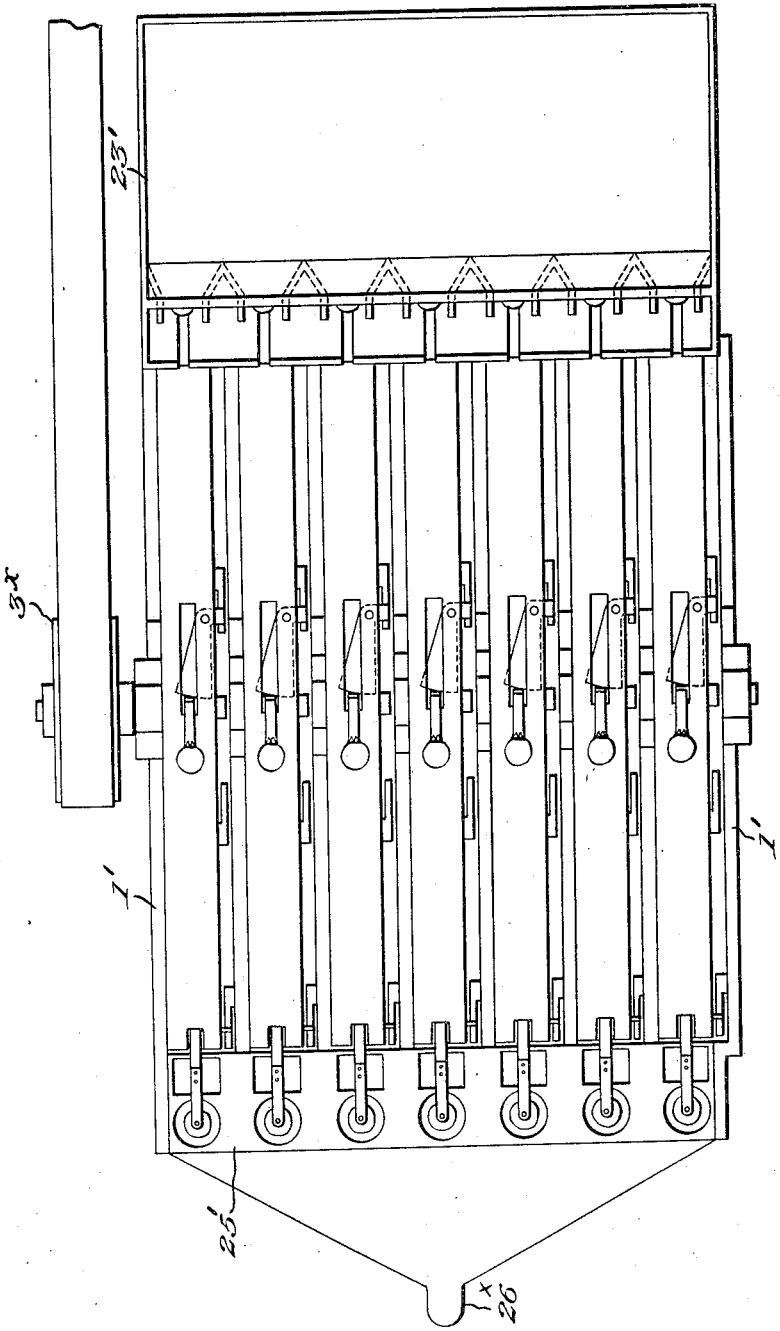
Fig. 8 is a plan view of Fig. 7.

When the apparatus is to be used for pitting a large quantity of cherries such as are used in factories for canning purposes I may provide a plurality of wheel members as shown in Figs. 7 and 8. In these figures the hubs of the members are connected with the shaft 3' which is supported in the framework 1' and this shaft is provided with a pulley $3^x$ which is connected by a belt with any suitable form of motor. The framework 1' also supports the large bin 23' which is provided with a plurality of slots, each slot receiving the punches of one of the wheel members. The other side of the frame supports the separator frame 26' which is provided with a plurality of extracting holes and chutes, as will be seen. The operation of this apparatus is the same as before described. In this case, however, the chutes for the cherries and those leading from the extracting openings are connected with the common chutes $26^x$ for the seeds and 26' for the cherries.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a supporting frame, a movable member thereon, a punch carried by said movable member, a bin for holding the cherries and through which the punch passes by the movement of said member, means on the punch for picking up a cherry from the bin, an extracting device coöperating with the punch for extracting the seed from the cherry and means actuated by the movement of the movable member for manipulating the punch to free it from the extracting device.

2. A device of the class described comprising a rotatable member, a punch carried thereby, a bin for the cherries through which the punch moves in the rotation of said member, means on the punch for picking up a cherry as it passes through the bin, an extracting device coöperating with the punch for removing the seed from the cherry, means on said rotatable member for swinging the punch out of engagement with the extracting device and abutments for actuating said means.

3. A device of the class described comprising a rotatable member, a punch carried thereby, a bin through which the punch moves in the rotation of said member, means on said punch for picking up a cherry as it passes through the bin, an extracting device in the path of the punch and comprising a frame having a tapered opening therein for receiving the end of the punch, a flexible member in said opening for stripping the seed from the punch and a cherry receiving chute on the frame, means on the rotatable member for swinging the punch out of engagement with the extracting device and abutments for actuating said means.

4. A device of the class described comprising a rotatable member, a punch thereon consisting of an L-shaped member having its outer arm of tubular construction and provided with prongs at its extremity, a needle passing through said arm, spring means for holding the needle with its point projecting beyond the prongs and means for pivotally supporting said punch on said rotatable member, a bin through which the prong passes in the rotation of the member so that the prongs and needle will pick up the cherry, an extracting device in the path of the punch, means on said device for coöperating with the punch to remove the seed from the cherry and means for swinging the punch upwardly out of engagement with the extracting device and permitting the punch to pass said device in the rotation of the member.

5. A device of the class described comprising a rotatable member, a punch thereon consisting of an L-shaped member having its outer arm of tubular construction and provided with prongs at its extremity, a needle passing through said arm, spring means for holding the needle with its point projecting beyond the prongs and means for pivotally supporting said punch on said rotatable member, a bin through which the prong passes in the rotation of the member so that the prongs and needle will pick up the cherry, an extracting device in the path of the punch, means on said device for coöperating with the punch to remove the seed from the cherry, means for swinging the punch upwardly out of engagement with the extracting device and permitting the punch to pass said device in the rotation of the member, such means consisting of a bar pivoted at one end to the rotatable member, a link connecting the other end of said bar to the inner end of the punch, an arm connected with said bar and a stationary abutment engaging the arm for swinging said bar downwardly to raise the punch.

6. A device of the class described comprising a rotatable member, a punch pivotally connected therewith, a bin through which the punch is passed in the rotation of said member, means on the punch for picking up a cherry from the bin, an extracting device in the path of the punch, means thereon for coöperating with the punch for removing the seed from the cherry, means for swinging the punch out of engagement with the extracting device after the seed is removed, a stationary abutment for operating said means, a latch member for holding the punch in operative position while engaging the extracting device and an abutment for moving said latch member into inoperative position.

7. A device of the class described comprising a rotatable member, a punch carried thereby, a bin for receiving the cherries and having a slot therein through which the punch passes, a partition plate spaced from the slotted wall of said bin and having its lower end spaced from the bottom of the bin, means on the punch for picking up a cherry from the bin and extracting means coöperating with the punch for removing the seed from the cherry.

8. A device of the class described comprising a supporting frame, a shaft journaled therein, a wheel member connected with the shaft, a plurality of punches pivotally connected with the wheel member and projecting beyond the rim of said member, said rim having slots therein through which said punch is passed, latch members normally lying across said slots for holding the punches in operative position, an abutment on the frame for moving said latch members into inoperative position, means on the spokes of the wheel member for swinging the punches upwardly through the slots, an abutment on the frame for actuating such means, a bin having a slot therein through which the punches pass, means on the punches for picking up a cherry as it passes through the bin and extracting means coöperating with the punches for removing the seeds from the cherries.

In testimony whereof I affix my signature.

CARL NICHOLS.